United States Patent [19]

Nozaki et al.

[11] Patent Number: 5,264,529
[45] Date of Patent: Nov. 23, 1993

[54] RESIN COMPOSITION FOR POWDER COATINGS

[75] Inventors: Tokuzo Nozaki; Katsuyoshi Atsumi; Katsuya Fujimoto, all of Aichi, Japan

[73] Assignee: Nippon Ester Co., Ltd., Aichi, Japan

[21] Appl. No.: 895,840

[22] Filed: Jun. 9, 1992

[51] Int. Cl.⁵ .............................................. C08F 20/00
[52] U.S. Cl. .................................... 525/438; 525/444; 525/449; 525/934
[58] Field of Search ................ 525/438, 444, 449, 934

[56] References Cited

U.S. PATENT DOCUMENTS 4,087,479  5/1978  Toyota et al. ........................ 525/438
4,263,195  4/1981  Vargia et al. ........................ 524/251

FOREIGN PATENT DOCUMENTS 64-1770  1/1989  Japan .
3-109468  5/1991  Japan .

Primary Examiner—Melvyn I. Marquis
Assistant Examiner—Randy Gulakowski
Attorney, Agent, or Firm—Sughrue Mion Zinn Macpeak & Seas

[57] ABSTRACT

A resin composition for powder coating which comprises a substantially un-gelled polyester A having an acid value of from 1,200 to 5,000 g eq/10⁶ g, a substantially un-gelled polyester B having an acid value of from 200 to 1,000 g eq/10⁶ g and triglycidyl isocyanurate as a curing agent, wherein the weight ratio of polyester A to polyester B is from 70:30 to 10:90 and the difference (absolute value) in the gel time between polyester A and polyester B is at least 3 minutes.

A resin composition for powder coating which causes no problems of polluting a baking oven, which shows less weight loss at the time of reaction and which can form a semi-mat or completely mat stable paint film is provided. These advantages cannot be obtained from any prior art powder coating that comprises a polyester having a large quantity of terminal hydroxyl groups and a blocked isocyanate-based curing agent.

6 Claims, No Drawings

RESIN COMPOSITION FOR POWDER COATINGS

FIELD OF THE INVENTION

The present invention relates to a resin composition for use in powder coatings, which forms a semi-mat or mat paint film.

BACKGROUND OF THE INVENTION

Among generally used powder coatings including epoxide-, acrylate- and polyester-based coatings, polyester-based powder coatings, especially those prepared from polyesters which have carboxyl groups as main terminal groups and are curable with triglycidyl isocyanurate, are known to form paint films having excellent weatherability and thermal stability.

Powder coatings are used in various fields including household electrical goods, automobiles, building materials and the like. From the esthetic point of view, the coated surface of the paint film is required to be glossy (60° specular gloss, about 90 to 100%), mat (60° specular gloss, about 30% or less) or semi-mat (60° specular gloss, about 30 to 70%).

In general, such a mat or semi-mat powder coating is prepared by a process in which a rough particled pigment is used as an additive agent in a large quantity or by a process in which a polyester powder coating and an acrylic powder coating are dry-blended (JP-B-61-19668). (The term "JP-B" as used herein means an "examined Japanese patent publication")

However, the addition of a large quantity of a rough particled pigment reduces the smoothness and mechanical strength of the resulting paint film. Also, the latter process in which two types of powder coatings are dry-blended has disadvantages in that a mat or semi-mat coating cannot be obtained in a single step, thus entailing high cost for the production of the coating, as well as non-uniformity of the blend and changes in the blending ratio at the time of recycle use.

With the object of overcoming such problems, a resin composition for use in powder coatings has been proposed in JP-A-64-1770 which comprises a polyester having a hydroxyl value of 1,200 g eq/$10^6$ g or more, another polyester having a hydroxyl value of from 200 to 1,000 g eq/$10^6$ g and a curing agent of the blocked isocyanate type, where the difference in the gel times between these two polyesters is at least 3 minutes. (The term "JP-A" as used herein means an "unexamined published Japanese patent application.)

However, the preparation of a powder coating using this prior art resin composition has disadvantages in that the blocking agent scatters and pollutes a baking oven when the polyesters are allowed to react with the curing agent of the blocked isocyanate type, and about 10% weight loss occurs at the same time.

In view of the above, the present invention is directed to overcoming the aforementioned problems involved in the prior art, thereby providing a resin composition for powder coating use which does not pollute a baking oven, which shows less weight loss at the time of reaction and which can form a stable paint film.

SUMMARY OF THE INVENTION

The inventors conducted intensive studies to solve the prior art problems and found that this object can be achieved by combining two types of polyesters, each having a specific acid value, with a curing agent of triglycidyl isocyanurate. The present invention was reached on the basis of this finding.

According to the present invention, there is provided a resin composition for powder coating which comprises a substantially un-gelled polyester A having an acid value of from 1,200 to 5,000 g eq/$10^6$ g, a substantially un-gelled polyester B having an acid value of from 200 to 1,000 g eq/$10^6$ g and triglycidyl isocyanurate as a curing agent, wherein the weight ratio of polyester A to polyester B is from 70:30 to 10:90 and the difference (absolute value) in the gel time between polyester A and polyester B is at least 3 minutes.

Other objects and advantages will be made apparent as the description progresses.

DETAILED DESCRIPTION OF THE INVENTION

In the present invention, acid value and gel time are determined by the following procedures.

Acid value

A polyester sample (0.5 g) is dissolved in 50 ml of dioxane under reflux (boiling point: 106° C.) and its acid value is measured by titrating the resulting solution with a methanol solution of potassium hydroxide (0.1N).

Gel time

A polyester sample whose gel time is to be measured is mixed with a curing agent of triglycidyl isocyanurate (Araldite PT-810, manufactured by Ciba-Geigy Ltd.) in such a mixing ration that carboxyl groups and glycidyl groups become equivalent and is further mixed with titanium dioxide powder (particle size: 0.2 to 0.5 μm) in such an amount that the titanium dioxide comprises 33% by weight of the total amount of the mixture. Using 90 g of the thus prepared sample, a curing curve at 160° C. is obtained by using a Brabender Plasticoder PLV-151 (available from Brabender), and the time required to reach the point of inflection is defined as the gel time.

In the resin composition of the present invention, polyester A should have an acid value of from 1,200 to 5,000 g eq/$10^6$ g, preferably in the range of from 2,000 to 4,000 g eq/$10^6$ g, and polyester B should have an acid value of from 200 to 1,000 g eq/$10^6$ g. If the acid value of polyester A is smaller than 1,200 g eq/$10^6$ g, polyester A provides no significant matting effect. If the acid value of polyester A is larger than 5,000 g eq/$10^6$ g, the resulting resin composition does not have the properties necessary for coating use due to a low degree of polymerization. If the acid value of polyester B is smaller than 200 g eq/$10^6$ g, this causes considerable irregularity on the surface of the resulting paint film, thus resulting in a reduction in smoothness. If the acid value of polyester B is larger than 1,000 g eq/$10^6$ g, this reduces the mechanical strength of the resulting paint film and polyester B provides no significant matting effect.

Polyesters A and B should be in a substantially un-gelled state. The term "substantially un-gelled polyester" as used herein means a polyester which can be crushed to particle size of 500 to 1,000 μm using general crushers (e.g., SAMPLE MILL AP-S mfd. by Hosokawamikuron K. K.) and which shows fluidity when the polyester powder is placed on a plate heated to the melting point of the polyester or higher. It is difficult to prepare a coating and to form a uniform paint film when a gelled polyester is used.

Taking weight loss at reaction, low temperature curability and the like into consideration, a curing agent of triglycidyl isocyanurate which is a crystalline trifunctional heterocyclic epoxy compound is used as the curing agent in the present invention. The curing agent may be used in such an amount that equivalency of the number of its functional groups to the number of carboxyl groups in the polyester resins is 0.6 to 1.4.

In the resin composition of the present invention, polyester A is blended with polyester B in a weight ratio of from 70:30 to 10:90, preferably from 40:60 to 20:80. Mixing ratios departing from this range will provide no significant matting effect.

In the resin composition of the present invention, it makes no difference in the paint film property which of polyesters A and B has the longer gel time but the difference (absolute value) in the gel times between polyesters A and B should be at least 3 minutes, preferably 3 to 15 minutes. A mat paint surface cannot be obtained when the gel time difference is less than 3 minutes and the gel time difference may be 5 to 10 minutes when a highly mat paint surface (60° specular gloss, 20% or less) is required. Use of resins with difference in gel time departing from this range will bear no significant matting effect and reduce mechanical strength.

According to the present invention, the matting degree can be controlled by changing the acid value of polyester A and the mixing ratio and gel time difference of polyesters A and B. For example, when the acid value of polyester A is about 3,000 g eq/$10^6$ g or more and the mixing ratio of polyesters A and B is 30:70, a semi-mat paint surface having a 60° specular gloss of 50 to 60% can be obtained by blending the resins having a gel time difference of 3 to 4 minutes. In the same manner, a mat paint surface having a 60° specular gloss of about 20% can be obtained by blending the resins having a gel time difference of about 5 minutes, and a completely mat paint surface having a 60° specular gloss of 10% or less can be obtained by blending the resins having a gel time difference of 6 minutes or more.

A polyester resin having a high acid value may be obtained by adding a polycarboxylic acid or its anhydride to a low acid value polyester resin, followed by a conventional esterification, addition or depolymerization reaction.

Examples of preferred polyester A as a component of the resin composition of the present invention may be those prepared from the following carboxylic acid and alcohol components.

Carboxylic acid component

A component consisting of terephthalic acid and/or isophthalic acid as the main constituent (85 mole % or more), further supplemented with a small quantity (15 mole % or less) of trimellitic acid and, if necessary, other polycarboxylic acids including aromatic dicarboxylic acids such as 2,6-naphthalene dicarboxylic acid and the like, aliphatic dicarboxylic acids such as succinic acid, adipic acid, azelaic acid and the like, and alicyclic dicarboxylic acids such as cyclohexane dicarboxylic acid and the like.

Alcohol component

A component consisting of ethylene glycol or neopentyl glycol as the main constituent, further supplemented if necessary with other dihydric alcohols including aliphatic glycols such as diethylene glycol, 1,2-propanediol and the like.

Examples of preferred polyester B as a component of the resin composition of the present invention may be those prepared from the following carboxylic acid and alcohol components.

Carboxylic acid component

A component consisting of terephthalic acid and/or isophthalic acid as the main constituent, further supplemented if necessary with aromatic dicarboxylic acids such as 2,6-naphthalene dicarboxylic acid and the like, aliphatic dicarboxylic acids such as succinic acid, adipic acid, azelaic acid and the like, alicyclic dicarboxylic acids such as 1,4-cyclohexane dicarboxylic acid and the like and a small quantity of polycarboxylic acids having three or more carboxyl groups such as trimellitic acid, pyromellitic acid and the like.

Alcohol component

A component consisting of ethylene glycol and neopentyl glycol as the main constituent, further supplemented if necessary with other aliphatic glycols such as diethylene glycol, 1,2-propanediol and the like.

Polyesters A and B may preferably have a number average polymerization degree of from 4 to 50 so that pulverization can be performed easily.

Also, polyesters A and B may preferably have a softening point of from 50° to 150° C. Softening points of lower than 50° C. would cause aggregation of pulverized resins and subsequent solidification, thus resulting in reduced anti-blocking ability, and that of higher than 150° C. would require a high kneading temperature which accelerates the curing reaction at the time of coating preparation, thus resulting in a reduction of the smoothness and mechanical strength of paint films.

The resin composition for powder coating of the present invention can be prepared by kneading polyesters A and B with the curing agent at a temperature of from 70° to 150° C. using a kneader or a roll.

If desired, the resin composition of the present invention may be mixed with additive agents such as a curing catalyst, a leveling agent and the like.

The following inventive and comparative examples are provided to further illustrate the present invention.

In this instance, characteristic values were measured in accordance with the following procedures.

Mean polymerization degree

Measured by gel permeation chromatography.

Acid value

Measured by the aforementioned procedure.

Softening Point

Measured by visual observation by heating a sample on a hot bench (Type WME, mfd. by REICHERT JUNG CO.).

Gel time

Measured by the aforementioned procedure.

60° Specular gloss

Measured in accordance with JIS K 5400.

Smoothness

Evaluated by visually observing the smoothness of paint films.

Impact resistance

Measured in accordance with JIS K 5400 using 500 g of ⅛ inch balls.

Pencil hardness

Measured in accordance with JIS K 5400.

Accelerated weather resistance

Measured in accordance with JIS K 5400 (200 hours).

Weight loss

Measured as a ratio of the difference in weight before and after the reaction to the weight before the reaction.

REFERENCE EXAMPLES 1 AND 2

Preparation of polyester A

A stainless steel reaction vessel equipped with an agitator was charged with the compounds shown in Table 1 and stirred with heating at 250° C. under a normal pressure for 6 hours, while water formed was removed continuously from the reaction system. To the resulting mixture there was added 5.84 parts by weight of antimony trioxide as a catalyst, and the reaction was carried out for 4 hours at 280° C. under a reduced pressure of 0.50 mmHg. After reducing the temperature to 270° C., the compounds shown in Table 2 were added to the resulting reaction mixture and depolymerization reaction was carried out under closed conditions to obtain polyester resins 1 and 2.

REFERENCE EXAMPLES 3 AND 4

Preparation of polyester B

The process of Reference Examples 1 and 2 was repeated to obtain polyester resins 3 and 4, except that the types and amounts of the compounds were changed in accordance with Tables 1 and 2.

REFERENCE EXAMPLES 5 TO 7

Preparation of polyester B

A stainless steel reaction vessel equipped with an agitator was charged with the compounds shown in Table 1 and 4.39 parts by weight of zinc acetate as a catalyst and the mixture was stirred with heating at 220° C. under a normal pressure for 6 hours, while methanol formed was continuously removed from the reaction system. To the resulting mixture there was added 5.84 parts by weight of antimony trioxide as a catalyst, and condensation polymerization reaction was carried out for 4 hours at 280° C. under a reduced pressure of 0.50 mmHg to obtain polyester resins having a high polymerization degree. After reducing the temperature to 270° C., the compounds shown in Table 2 were added to the resulting reaction mixture and depolymerization reaction was carried out under closed conditions to obtain polyester resins 5 to 7. The characteristic values of each polyester resin thus prepared are shown in Table 3.

TABLE 1

| Reference Example | 1 | 2 | 3 | 4 | 5 | 6 | 7 |
|---|---|---|---|---|---|---|---|
| Terephthalic acid | 16600 | 14940 | 13280 | 11620 | | | |
| Isophthalic acid | | 1660 | 3320 | 4980 | | | |
| Dimethyl terephthalate | | | | | 19400 | 17460 | 15520 |
| Dimethyl isophthalate | | | | | | 1940 | 3880 |
| Ethylene glycol | 3720 | 310 | 2480 | 9300 | 3100 | | 2480 |
| Neopentyl glycol | 10400 | 16120 | 12480 | | 11440 | 16640 | 12480 |
| Diethylene glycol | | | | 1060 | | | |

TABLE 2

| Reference Example | 1 | 2 | 3 | 4 | 5 | 6 | 7 |
|---|---|---|---|---|---|---|---|
| Trimellitic acid | 5760 | 2880 | | 384 | | 192 | 576 |
| Isophthalic acid | | | 1107 | 775 | 830 | 664 | 332 |

(The numbers in Tables 1 and 2 are parts by weight.)

TABLE 3

| Polyester resin | 1 | 2 | 3 | 4 | 5 | 6 | 7 |
|---|---|---|---|---|---|---|---|
| Mean polymerization degree | 3.5 | 6.8 | 14.8 | 14.9 | 19.5 | 19.7 | 19.8 |
| Acid value (g eq/$10^6$ g) | 3510 | 1850 | 540 | 610 | 400 | 450 | 590 |
| Softening point(°C.) | 68 | 72 | 80 | 78 | 85 | 82 | 85 |
| Gel time (min.) | 4.5 | 6.8 | 10.9 | 9.5 | 12.4 | 11.8 | 10.1 |

EXAMPLES 1 TO 8 AND COMPARATIVE EXAMPLES 1 TO 4

Two of the polyester resins shown in Tables 4 and 5, triglycidyl isocyanurate (Araldite PT-810, manufactured by Ciba-Geigy Ltd.) as a curing agent, a butylpolyacrylate type leveling agent (Acronal 4F, manufactured by BASF), benzoin and titanium dioxide (particle size: 0.2 to 0.5 μm) were subjected to dry blending with the mixing ratio being as shown in Tables 4 and 5 at 2,000 to 3,000 rpm for 3 to 5 munites using a Henschel mixer (FM 20B, manufactured by Mitsui Miike Machinery Co., Ltd.). The resulting blend was melt-kneaded at 110° C. using a co-kneader (PR-46, manufactured by Buss). After cooling, the kneaded product was crushed and filtered through a 145 mesh wire net to obtain a powder coating.

The thus obtained powder coating was coated on a zinc phosphate-treated steel sheet to a film thickness of 50 to 60 μm by electrostatic coating, followed by 20 minutes of baking at 160° C.

Results of the evaluation of paint film properties are shown in Tables 6 and 7, together with gel time differences of the polyester resins.

TABLE 4

| Example No. | 1 | 2 | 3 | 4 | 5 | 6 | 7 | 8 |
|---|---|---|---|---|---|---|---|---|
| Polyester resin 1 | 26 | 26 | 26 | 18 | 26 | | | |
| Polyester resin 2 | | | | | | 28 | 28 | 28 |
| Polyester resin 3 | 61 | | | | | | | |
| Polyester resin 4 | | 61 | | | | | | |
| Polyester resin 5 | | | 62 | 72 | | 64 | | |
| Polyester resin 6 | | | | | 62 | | 64 | |
| Polyester resin 7 | | | | | | | | 63 |
| Curing agent | 13 | 13 | 12 | 10 | 12 | 8 | 8 | 9 |
| Leveling agent | 1 | 1 | 1 | 1 | 1 | 1 | 1 | 1 |
| Benzoin | 0.5 | 0.5 | 0.5 | 0.5 | 0.5 | 0.5 | 0.5 | 0.5 |
| Titanium dioxide | 50 | 50 | 50 | 50 | 50 | 50 | 50 | 50 |

TABLE 5

| Comp. Ex. No. | 1 | 2 | 3 | 4 |
|---|---|---|---|---|
| Polyester resin 1 | | | 64 | 5 |
| Polyester resin 2 | 27 | | | |
| Polyester resin 3 | | | 15 | 89 |
| Polyester resin 4 | 64 | 67 | | |
| Polyester resin 5 | | | | |
| Polyester resin 6 | | 29 | | |
| Polyester resin 7 | | | | |
| Curing agent | 9 | 4 | 21 | 6 |
| Leveling agent | 1 | 1 | 1 | 1 |
| Benzoin | 0.5 | 0.5 | 0.5 | 0.5 |
| Titanium dioxide | 50 | 50 | 50 | 50 |

(The numbers in Tables 4 and 5 are parts by weight.)

TABLE 6

| Ex. No. | 1 | 2 | 3 | 4 | 5 | 6 | 7 | 8 |
|---|---|---|---|---|---|---|---|---|
| Difference in gel time (min.) | 6.4 | 5.0 | 7.9 | 7.9 | 7.3 | 5.6 | 5.0 | 3.3 |
| 60° Specular gloss (%) | 5 | 25 | 4 | 30 | 5 | 48 | 41 | 51 |
| Smoothness | good | good | good | good | good | good | good | good |
| Impact strength (cm) | >50 | >50 | 40 | >50 | >50 | >50 | >50 | >50 |
| Pencil hardness | H | 2H | H | H | 2H | H | H | H |
| Weight loss (%) | 1.2 | 1.1 | 1.0 | 0.9 | 1.1 | 0.8 | 0.8 | 0.9 |
| Accelerated weather resistance | n.p. | n.p. | n.p. | n.p. | n.p. | n.p. | n.p. | n.p.* |

(*no problem)

TABLE 7

| Comp. Ex. No. | 1 | 2 | 3 | 4 |
|---|---|---|---|---|
| Difference in gel time (min.) | 2.7 | 2.3 | 6.4 | 6.4 |
| 60° Specular gloss (%) | 70 | 85 | 90 | 92 |
| Smoothness | good | good | good | good |
| Impact strength (cm) | 40 | >50 | 35 | >50 |
| Pencil hardness | H | HB | 3H | HB |
| Weight loss (%) | 0.8 | 0.6 | 1.5 | 0.7 |
| Accelerated weather resistance | n.p. | n.p. | n.p. | n.p.* |

(*no problem)

Thus, it is clear that there has been provided, in accordance wit the present invention, a resin composition for powder coating which causes no problems of polluting a baking oven, which shows less weight loss at the time of reaction and which can form a semi-mat or completely mat stable paint film.

While the invention has been described in detail and with reference to specific examples thereof, it will be apparent to one skilled in the art that various changes and modification can be made therein without departing from the spirit and scope thereof.

What is claimed is:

1. A resin composition which forms a semi-mat film having a 60° specular gloss of about 30 to 70% or mat film having a 60° specular gloss of about 30 or less for powder coating which comprises a substantially un-gelled polyester A having an acid value of from 1,200 to 5,000 g eq/$10^6$ g, a substantially un-gelled polyester B having an acid value of from 200 to 1,000 g eq/$10^6$ g and triglycidyl isocyanurate as a curing agent, wherein the weight ratio of polyester A to polyester B is from 70:30 to 10:90 and the difference (absolute value) in the gel time between polyester A and polyester B is at least 3 minutes.

2. The resin composition according to claim 1, wherein polyester A comprises terephthalic acid and/or isophthalic acid and trimellitic acid as main acid components and ethylene glycol or neopentyl glycol as main alcohol components and polyester B comprises terephthalic acid and/or isophthalic acid as main acid components and ethylene glycol and neopentyl glycol as main alcohol components.

3. The resin composition according to claim 1, wherein the ratio of polyester A to polyester B is in the range of from 40:60 to 20:80 by weight.

4. The resin composition according to claim 1, wherein said triglycidyl isocyanurate is used in such an amount that equivalency of the number of its functional groups to the number of carboxyl groups in the polyester resins is 0.6 to 1.4.

5. The resin composition according to claim 1, wherein the acid value of said polyester A is in the range of from 2,000 to 4,000 g eq/$10^6$ g.

6. The resin composition according to claim 1, wherein each of said polyesters A and B has a softening point of from 50° to 150° C.

* * * * *